United States Patent [19]

Schardt

[11] 4,309,937

[45] Jan. 12, 1982

[54] COMPOSITE MASTER CYLINDER PISTONS

[75] Inventor: Michael M. Schardt, Centerville, Ohio

[73] Assignee: General Motors Corporation, Detroit, Mich.

[21] Appl. No.: 87,997

[22] Filed: Oct. 25, 1979

[51] Int. Cl.³ .............................. F16J 1/02; F16J 9/08
[52] U.S. Cl. ...................................... 92/240; 60/562;
60/581; 92/248; 92/249; 92/253
[58] Field of Search ................. 92/175, 243, 248, 249,
92/240, 253, 244; 60/581, 562; 277/166, 189

[56] References Cited

U.S. PATENT DOCUMENTS

| | | | |
|---|---|---|---|
| 1,802,281 | 4/1931 | Shimer | 92/243 |
| 2,170,574 | 8/1939 | Sauzedde | |
| 2,214,261 | 9/1940 | Roth | |
| 2,349,345 | 5/1944 | Goepfrich | |
| 2,962,330 | 11/1960 | Kohl | 92/253 X |
| 3,334,549 | 8/1967 | Sheldon | 92/248 |
| 3,464,323 | 9/1969 | Saksun | 92/243 |
| 3,505,930 | 4/1970 | Schrader | 92/240 |
| 3,636,824 | 1/1972 | Clark | 92/249 |
| 4,079,951 | 3/1978 | Sievenpiper | 277/166 X |

FOREIGN PATENT DOCUMENTS

| | | | |
|---|---|---|---|
| 895103 | 3/1972 | Canada | 92/249 |
| 337344 | 10/1930 | United Kingdom | 92/243 |

Primary Examiner—Irwin C. Cohen
Attorney, Agent, or Firm—D. D. McGraw

[57] ABSTRACT

Each of the pistons has a metallic, ceramic or high glass nylon plastic core insert with glass-filled nylon plastic molded around it to form the finished piston. The finished piston is ready to use as it comes from the mold. The core insert is designed to maintain a substantially uniform plastic wall thickness and provide support lands behind the high pressure lands of the piston. The core insert also incorporates undercuts or grooves to prevent the core from being pushed out of the piston assembly. The grooves also allow the plastic to bond to the core. The core insert transmits the direct axial force of the push rod, and the plastic outer case supports the seals.

2 Claims, 1 Drawing Figure

U.S. Patent     Jan. 12, 1982     4,309,937
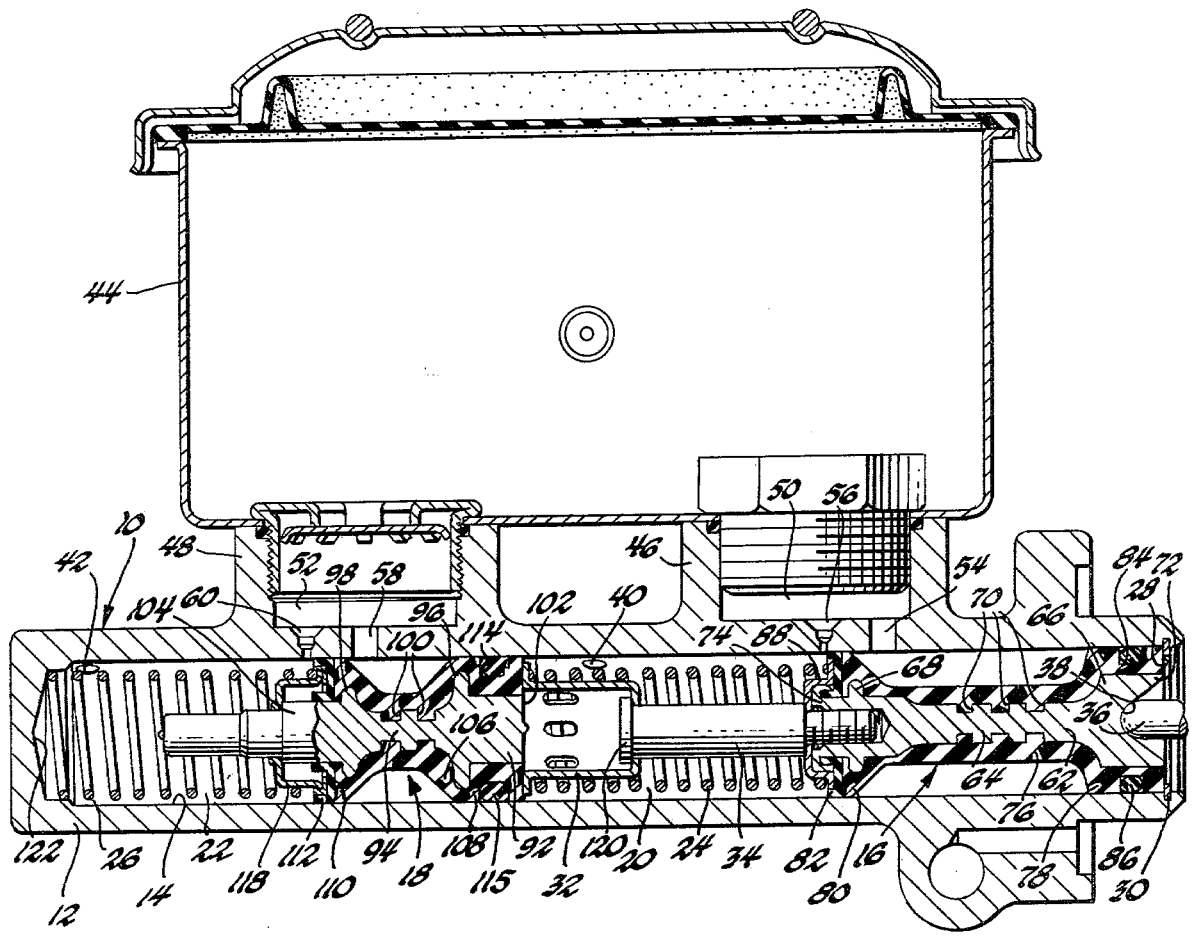

COMPOSITE MASTER CYLINDER PISTONS

The invention relates to master cylinder pistons which are constructed in composite form, and more particularly to such pistons having a metallic, ceramic or high glass-filled nylon plastic core covered with an envelope of a suitable material such as glass-filled nylon plastic molded around it to form the finished piston. The core is so proportioned in relation to the finished piston as to maintain a substantially uniform plastic wall thickness. The core also provides support lands behind the high pressure lands, incorporates undercuts to prevent the core from being pushed out of the plastic envelope, the transmits axially directed forces through the piston. By using a plastic envelope around the core, the piston is in finished form and ready for use as it comes from the plastic mold.

In the drawing:

The single FIGURE illustrates a master cylinder assembly in cross section and having primary and secondary pistons embodying the invention.

The master cylinder 10 is of the typical master cylinder design known as a dual master cylinder. The master cylinder housing 12 has a bore 14 in which the primary piston 16 and the secondary piston 18 are reciprocably retained. A primary pressurizing chamber 20 is defined by a portion of bore 14 and the adjacent ends of pistons 16 and 18. The secondary pressurizing chamber 22 is defined by the forward end of secondary piston 18 and the forward portion of bore 14. Piston return springs 24 and 26 are respectively provided in chambers 20 and 22 and urge the pistons rearwardly to their release positions illustrated in the drawing. The rear end 28 of piston 16 abuts a retaining ring 30 to define the released position of piston 16. Spring 24 acts on a secondary piston stop 32 and an extension screw 34 so that the spring is caged and provides a definite release position for secondary piston 18. A push rod 36 fits in a recess 38 in end 28 of piston 16 and is axially moved by the vehicle operator to apply the brake. Fluid pressurized in chambers 20 and 22 is connected with separate brake circuits through the respective outlets 40 and 42.

A reservoir 44 of a suitable type is mounted on housing 12 and contains brake fluid. In the particular assembly illustrated, reservoir 44 is mounted on bosses 46 and 48 which contain reservoir subchambers 50 and 52. Compensation and bypass ports 54, 56, 58 and 60 are provided to communicate fluid between the reservoir 44 and the bore 14 as is well-known in the art.

Piston 16 includes a core 62 which is preferably made of a suitable material. The core material must be sufficiently hard and strong to transmit the axial forces to which the piston is often subjected without significant deformation or deterioration over the useful life of the assembly. While metals such as aluminum are satisfactory, proper combinations of non-metallic materials including some ceramics and filled hard plastic such as high glass content nylon are useful in some instances. For purposes of description and the definition of the invention in the claims, the term "metal or equivalent core" is to be interpreted in accordance with the above explanation. Core 62 has a reduced diameter body portion 64 in the axially central portion and enlarged end portions defining axially spaced lands 66 and 68. The reduced diameter body portion 64 has one or more grooves 70, with three such grooves being illustrated.

The core 62 has axially opposite ends 72 and 74, with recess 38 being formed in part of core end 72.

Piston 16 further includes an envelope 76 which is generally cylindrical and made of a suitable hard plastic such as glass-filled nylon. Envelope 76 is molded over core 62 so that it covers substantially all of the outer periphery of the core but does not cover the core ends 72 and 74. The envelope 76 is molded over lands 66 and 68 and the entire reduced diameter body portion 64, including grooves 70. The envelope therefore securely grips the core so that it will not have any relative axial motion. The core and envelope effectively make a unitary assembly. Envelope 76 is of substantially uniform wall thickness. The envelope 76 has axially spaced lands 78 and 80 which are molded over core lands 66 and 68, respectively. Land 80 is the forward land and provides back-up support for the pressure cup or seal 82 of the primary piston 16. Thus land 68 adds additional strength to land 80 to axially support seal 82 as fluid is pressurized in chamber 20. Land 78 is formed with an outer peripheral groove 84 which contains a seal 86 in sealing relation with the wall of bore 14.

The spring retaining extension screw 34 has a rear seal retainer 88 secured thereto and arranged in abutting relation with the forward end 74 of core 62. Thus mechanical force exerted by push rod 36 on core 62 is also transmitted through retainer 88 to extension screw 34 and spring 24.

Piston 18 is constructed in a manner generally similar to piston 16. It has a core 92 provided with a reduced diameter body portion 94 and axially spaced lands 96 and 98. The reduced diameter body portion 94 is provided with one or more grooves 100, and two such grooves are illustrated. The axially opposite core ends 102 and 104 are respectively exposed to pressure chambers 20 and 22. The hard plastic envelope 106 is molded in place on core 92 in final finished form and securely grips the core. Envelope 106 has a substantially uniform wall thickness. It does not cover either core end 102 or core end 104. It is molded to provide lands 108 and 110, which are respectively molded over core lands 96 and 98. Land 110 provides axial support for the secondary cup or seal 112, and land 98 provides further axial strengthening and support when fluid is pressurized in chamber 22. Land 108 is provided with an outer peripheral groove 114 in which seal 115 is received in sealing relation relative to the wall of bore 14. Land 108 provides axial support for seal 115, and land 96 provides further axial strengthening and support when fluid is pressurized in chamber 20. The spring retainer 118 fits over and abuts a shoulder on the core forward end 104, which extends forward and axially outward relative to envelope 106.

In normal operation the master cylinder is actuated by movement of push rod 36 leftwardly as seen in the drawing, with seal 82 closing port 56 as springs 24 and 26 are slightly compressed. Further movement of piston 16 causes the fluid in chamber 20 to be pressurized and displaced through outlet 40 to a brake circuit. Secondary piston 18 is also moved leftwardly by force exerted through spring 24 and the pressure in chamber 20 acting on the rear end of the piston, so that seal 112 closes port 60. Further leftward movement of secondary piston 18 causes fluid to be pressurized in chamber 22 and conducted through outlet 42 to a brake circuit.

If fluid cannot be pressurized in chamber 20, for example, push rod 36 moves piston 16 leftwardly until the forward end 120 of extension screw 34 engages the rear end 102 of secondary piston core 92. This sets up a mechanical force path from the push rod through core 62, extension screw 34, and core 92 to move the secondary piston 18 in a pressurizing direction to pressurize fluid in chamber 22.

If fluid can be pressurized only in chamber 20 of the master cylinder, actuation of the master cylinder will cause mechanical force to be exerted from push rod 36 through core 62, extension screw 34 and seal retainer 88, spring 24 and secondary piston stop 32 to move the secondary piston 18 forwardly until the forward end 104 of piston core 92 engages the bore closed end 122. Further leftward movement of piston 16 will then cause fluid to be pressurized in chamber 20 and directed to the brake circuit connected with outlet 40.

The pistons of the invention are light in weight, require less final finishing in that when they are removed from the plastic envelope mold they are ready for use, and the cores do not require as close tolerance finish as do all-metal pistons. The metal-to-metal mechanical force paths set up in the usual all-metal pistons are retained so that no mechanical force path is established to exert the full brake actuating force through only the plastic envelope.

The embodiments of the invention in which an exclusive property or privilege is claimed are defined as follows:

1. A composite master cylinder piston assembly including a piston and comprising:
   first and second piston seals mounted in axially spaced relation on said piston;
   a metal or equivalent hard plastic or ceramic core and a generally cylindrical hard plastic envelope encircling and secured to said core, said core and said envelope defining said piston, said envelope being made of glass-filled nylon or equivalent hard plastic;
   said envelope having first and second axially spaced lands abutting and providing aligned axial support for said piston seals;
   said core having opposed end sections provided respectively with third and fourth axially spaced lands respectively received axially and radially within said first and second lands and providing aligned axial and radial support thereto, said core further having a reduced diameter body portion of smaller diameter than said opposed end sections and said third and fourth lands and axially intermediate said third and fourth lands, and one or more grooves formed on said reduced diameter body portion, said core opposed end sections having axially opposite ends axially exposed relative to said envelope and constructed and arranged to transmit direct axial force therethrough;
   said envelope being molded in place on said core in final finished form and securely gripping said core through full radial and axial surface interface contact with said third and fourth lands and said core reduced diameter body portion, and having a substantially uniform wall thickness such that the radial thickness of the part of said envelope radially outward of said core reduced diameter body portion is substantially equal to the radial thickness of the other parts of said envelope and the diameter thereof is less than the diameter of either of said third and fourth lands of said core.

2. A composite master cylinder piston assembly comprising:
   a metal or equivalent hard plastic or ceramic core, a generally cylindrical hard plastic envelope radially encircling and secured to said core and cooperating therewith to define a piston, and first and second seals mounted in axially spaced relation on said piston;
   said envelope having first and second axially spaced lands respectively having said first and second seals aligned therewith and axially abutting and supported thereon, said first seal being a cup-shaped pressure seal which, when pressurizing fluid, exerts an axial force on said first land corresponding to the pressure of the fluid being pressurized;
   said core having opposed end sections respectively provided with third and fourth axially spaced lands which are respectively received axially and radially within said first and second lands, said third land providing aligned axial force support to said first land when said first seal has pressurized fluid on one side thereof, said core further having a reduced diameter body portion of smaller diameter than said opposed end sections and said third and fourth lands and axially intermediate said third and fourth lands, and one or more grooves formed on said reduced diameter body portion, said core opposed end sections having axially opposite ends axially exposed relative to said envelope and constructed and arranged to transmit direct axial force therethrough;
   said envelope enfolding said core and being molded in place on said core in final finished form and securely gripping said core through radial and axial full surface interface contact with said third and fourth lands and said core reduced diameter body portion, and having a substantially uniform wall thickness such that the radial thickness of the part of said envelope positioned radially outward of said core reduced diameter body portion is substantially equal to the radial thickness of the other parts of said envelope and the diameter of the part of said envelope positioned radially outward of said core reduced diameter body portion is less than the diameter of either of said third and fourth lands of said core.

* * * * *